(12) United States Patent
Markowitz

(10) Patent No.: US 11,706,015 B2
(45) Date of Patent: *Jul. 18, 2023

(54) SIDE CHANNEL TIMING ATTACK MITIGATION IN SECURING DATA IN TRANSIT

(71) Applicant: Google LLC, Mountain View, CA (US)

(72) Inventor: Adam Markowitz, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 17/452,412

(22) Filed: Oct. 27, 2021

(65) Prior Publication Data
US 2022/0052833 A1 Feb. 17, 2022

Related U.S. Application Data

(63) Continuation of application No. 16/362,675, filed on Mar. 24, 2019, now Pat. No. 11,177,933.

(51) Int. Cl.
| | | |
|---|---|---|
| *H04L 29/06* | (2006.01) | |
| *H04L 9/00* | (2022.01) | |
| *H04L 9/08* | (2006.01) | |
| *H04L 9/06* | (2006.01) | |
| *H04L 9/32* | (2006.01) | |

(52) U.S. Cl.
CPC ............ *H04L 9/003* (2013.01); *H04L 9/0618* (2013.01); *H04L 9/0844* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 9,705,674 B2* | 7/2017 | Roth | H04L 9/30 |
| 10,454,674 B1* | 10/2019 | Bar-El | H04L 63/123 |
| 10,942,856 B2* | 3/2021 | Sandberg | G06F 12/0811 |
| 10,942,988 B2* | 3/2021 | Taylor | G06F 16/288 |
| 2014/0059688 A1* | 2/2014 | Margalit | G06F 21/561 |
| | | | 726/24 |
| 2016/0352509 A1* | 12/2016 | Wu | G09C 1/00 |
| 2017/0026169 A1* | 1/2017 | Sugahara | H04L 9/0656 |
| 2017/0141912 A1* | 5/2017 | Cech | G06F 21/755 |

(Continued)

FOREIGN PATENT DOCUMENTS

| | | |
|---|---|---|
| CA | 2325113 A1 | 5/2001 |
| CN | 102412963 B | 6/2014 |

(Continued)

*Primary Examiner* — Hee K Song
*Assistant Examiner* — Hassan A Hussein
(74) *Attorney, Agent, or Firm* — Hontgman LLP; Brett A. Krueger; Grant Griffith

(57) ABSTRACT

A method for side-channel attack mitigation in streaming encryption includes reading an input stream into a decryption process, extracting an encryption envelope having a wrapped key, a cipher text, and a first message authentication code (MAC) from the input stream, generating a second MAC using the wrapped key of the encryption envelope, and performing decryption of the cipher text in constant time by determining whether the encryption envelope is authentic by comparing the first MAC extracted from the encryption envelope and the second MAC generated using the wrapped key.

20 Claims, 2 Drawing Sheets

(56) References Cited

U.S. PATENT DOCUMENTS

2018/0323958 A1* 11/2018 Courtney ................. H04L 9/003
2020/0110906 A1* 4/2020 Choi ......................... H04L 9/06

FOREIGN PATENT DOCUMENTS

| | | | |
|---|---|---|---|
| CN | 104734842 | A | 6/2015 |
| CN | 107005415 | A | 8/2017 |
| CN | 109039590 | A | 12/2018 |
| CN | 109359472 | A | 2/2019 |
| EP | 1142191 | B1 | 8/2006 |
| JP | 4712017 | B2 | 6/2011 |
| JP | 2019205152 | A | 11/2019 |
| KR | 101472777 | B1 | 12/2014 |
| WO | 2014059547 | A1 | 4/2014 |

* cited by examiner

SIDE CHANNEL TIMING ATTACK MITIGATION IN SECURING DATA IN TRANSIT

CROSS-REFERENCE TO RELATED APPLICATIONS

This U.S. patent application is a continuation of, and claims priority under 35 U.S.C. § 120 from, U.S. patent application Ser. No. 16/362,675, filed on Mar. 24, 2019. The disclosure of this prior application is considered part of the disclosure of this application and is hereby incorporated by reference in its entirety.

BACKGROUND

Field of the Disclosure

Implementations herein relates to the field of data security and more particularly to securing data in transit in a data processing system.

Description of the Related Art

In the field of data processing, data at rest refers to inactive data stored physically in any digital form including within a database, data warehouse, document including a spreadsheet, or digital archive or other persistent memory including that found within a mobile device. Data at rest may be compared to data in use and data in transit, thus defining three understood states of digital data. Like data in use and data at rest, data in transmit, also known as streaming data, also must be secured for view by unauthorized entities. To that end, data encryption is commonly used to protect data in transit. General encryption techniques employed for data in transmit include strong encryption methods such as advanced encryption standard (AES) or Rivest-Shamir-Adleman (RSA) and ensure that encrypted data remains encrypted when access controls such as user-names and password fail.

General encryption of data in transmit is not without its challenges. In this regard, existing methods of authenticating associated data with encrypted content with cryptographic systems such as AES requires the use of a method authen-tication code (MAC) whose signature is checked to authen-ticate both the ciphertext of the associated data as well as any additional authenticated data (AAD). It is common for an encryption envelope to include an AAD.

The foregoing process works well when retrieving all of the encrypted content at once by throwing an exception at the end of the reading of data, and notifying the client that the content failed the MAC signature check. However, if the data is streamed, the exception will not be raised until the entirety of the content has been read. Yet, it is undesirable to decrypt secret data with a real key when it has been determined that the encryption envelope and/or AAD have been tampered with. It is also undesirable to short circuit the decryption of the encrypted cipher text of the streaming data if the encryption envelope and/or AAD have been deter-mined to have been tampered with as to do so introduces timing difference between processing legitimate streaming data and illegitimate streaming data.

More particular, the foregoing introduces a side-channel timing attack based upon the variable time processing of streaming data. In a side-channel timing attack, the attacker attempts to compromise a cryptosystem by analyzing the time taken to execute cryptographic algorithms. Indeed, the malicious determination of otherwise protected secrets through timing information may be significantly easier than using cryptanalysis of known plaintext, ciphertext pairs. Sometimes timing information is combined with cryptanaly-sis to increase the rate of information leakage.

SUMMARY

Embodiments of the present disclosure address deficien-cies of the art in respect to streaming encryption and the prevention of side-channel timing attacks and provide a novel and non-obvious method, system and computer pro-gram product for side-channel attack mitigation in streaming encryption. In an embodiment of the disclosure, a method for side-channel attack mitigation in streaming encryption includes reading into a decryption process executing in memory of a computer, an input stream and extracting from the input stream both an encryption envelope and cipher text and extracting from the encryption envelope, a wrapped key. Then, decryption may be performed in constant time of the cipher text using one of two different keys, a first for authenticated decryption comprising the wrapped key, and a second for unauthenticated encryption comprising a dummy key, with no difference in timing of execution regardless of which of the two different keys are utilized during decryp-tion of the cipher text.

In one aspect of the embodiment, the decryption in constant time includes the generation of the dummy key that differs from the wrapped key, the reading from the input stream of a message authentication code (MAC) and then generation of a MAC for the encryption envelope. Then, the encryption envelope is authenticated by comparing both MAC. On the condition that the encryption envelope passes authentication, the wrapped key is used to decrypt the cipher text. But, on the condition that the encryption envelope fails authentication, the dummy key is utilized to decrypt the cipher text. Optionally, a MAC verification is performed on the cipher text after decryption with a returning of a failure code upon failure. But otherwise, the decrypted cipher text is returned as output of the decryption process.

In another embodiment of the disclosure, a streaming decryption data processing system is provided. The system includes a host computer with memory and at least one processor and a decryption process executing in the memory of the host computer and performing decryption of input streams. The system also includes a side-channel attack mitigation module. The module includes computer program code executing in the memory of the host computer. The program code during execution is operable in streaming encryption to read in an input stream into the decryption process, extract from the input stream both an encryption envelope and cipher text and extract from the encryption envelope, a wrapped key, and perform decryption in con-stant time of the cipher text using one of two different keys, a first for authenticated decryption that includes the wrapped key, and a second for unauthenticated encryption that includes a dummy key, with no difference in timing of execution regardless of which of the two different keys are utilized during decryption of the cipher text.

Additional aspects of the disclosure will be set forth in part in the description which follows, and in part will be obvious from the description, or may be learned by practice of the disclosure. The aspects of the disclosure will be realized and attained by means of the elements and combi-nations particularly pointed out in the appended claims. It is to be understood that both the foregoing general description and the following detailed description are exemplary and explanatory only and are not restrictive of the disclosure, as claimed.

BRIEF DESCRIPTION OF THE SEVERAL VIEWS OF THE DRAWINGS

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein.

DETAILED DESCRIPTION

Figure 1:
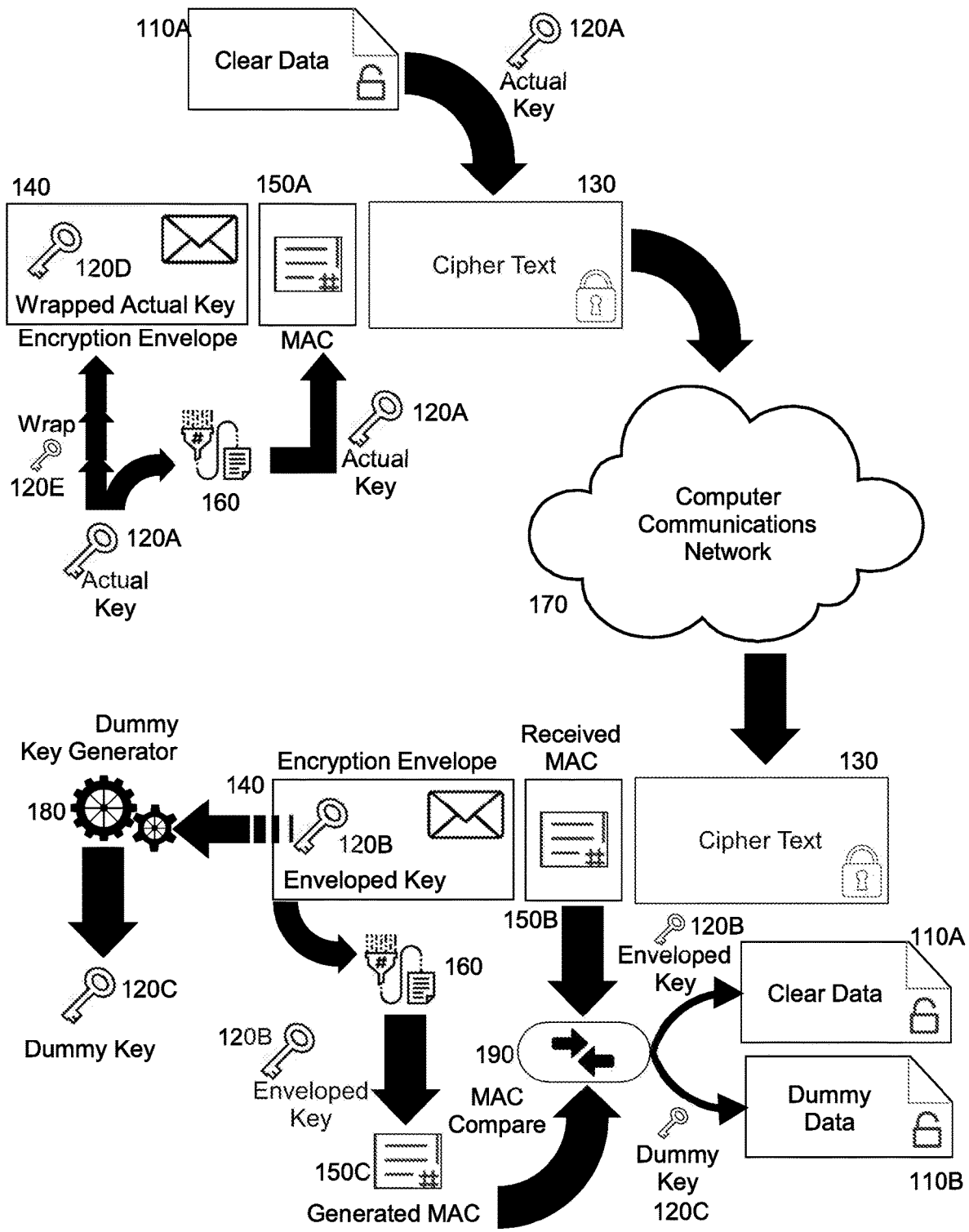
FIG. 1 is pictorial illustration of a process for side-channel timing attack mitigation in streaming data decryption.

Embodiments of the disclosure provide for side-channel timing attack mitigation in streaming data decryption. In accordance with an embodiment of the disclosure, streaming data is received that includes each of cipher text symmetrically encrypted using a legitimate key, an encryption envelope holding a key purportedly to be the legitimate key, and a MAC computed for the encryption envelope purportedly using the legitimate key. Then, using constant-time decryption, the cipher text is decrypted to produce legitimate clear text, or illegitimate clear text depending upon whether or not the MAC for the encryption envelope is determined to be authentic or inauthentic. Optionally, an additional MAC verification is performed on the cipher text after decryption and a failure code returned upon failure, but otherwise the decrypted cipher text is provided as the output of the decryption process In further illustration, FIG. 1 is pictorial illustration of a process for side-channel timing attack mitigation in streaming data decryption. As shown in FIG. 1, clear, unencrypted data 110A may be symmetrically encrypted utilizing actual key 120A to produce cipher text 130. The actual key 120A is then wrapped with wrapping key 120E to wrapped key 120D which is then placed in encryption envelope 140 and a MAC 150A generated using the actual key 120A and a hash MAC generation function 160 to produce the MAC 150A. The data including encryption envelope 140, MAC 150A and cipher text 130 is then transmitted over computer communications network 170 to a recipient client.

Upon receipt of cipher text 130, an encryption envelope 140 and a received MAC 150B therefore, the recipient client extracts from the encryption envelope 140 the enveloped key 120A that purports to be the actual key 120A and creates a dummy key 120C in a secure fashion from the enveloped key 120B that differs from the enveloped key 120B and the actual key 120A, and that explicitly has no relation to the actual key 120A. Then, a MAC 150C is generated for the encryption envelope 140 utilizing the enveloped key 120B and hash MAC generation function 160. To the extent that the enveloped key 120B is in fact the actual key 120A and the content of the encryption envelope 140 including any AAD has not changed since prior to transmission, then the generated MAC 150C will be the same as the received MAC 150B. However, if the enveloped key 120B is different than the actual key 120A, or if the content of the encryption envelope 140 including any AAD included in the encryption envelope 140 has changed since transmission, then the generated MAC 150C will be different than the received MAC 150B.

Consequently, both the generated MAC 150C and the MAC 150B are compared to one another in comparator 190. On the condition that the generated MAC 150C is equivalent to the received MAC 150B, then the cipher text 130 is decrypted utilizing the enveloped key 120B to produce the original, clear, unencrypted data 110A. Otherwise, on the opposite condition that the generated MAC 150C differs from the received MAC 150B, then the cipher text 130 is decrypted utilizing the generated dummy key 120C so as to produce decrypted, dummy data 110B. But, in either circumstance, the decryption will have been performed in constant computational time irrespective of whether or not the original, clear, unencrypted data 110A is produced, or the decrypted, dummy data 110B.

Figure 2:
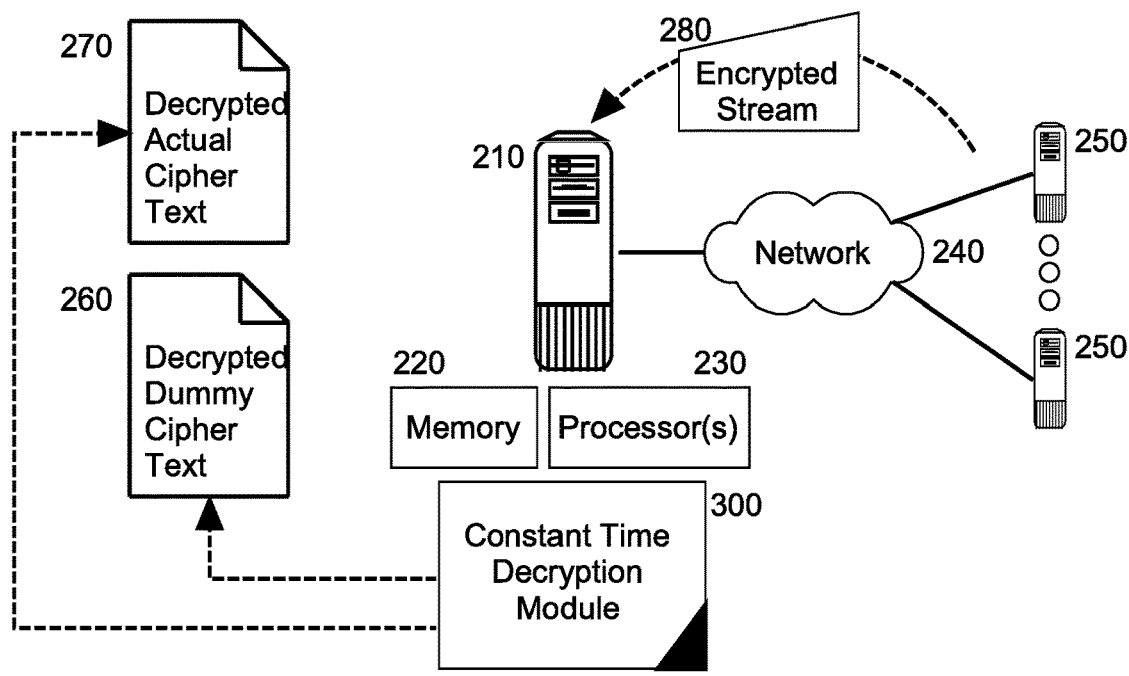
FIG. 2 is a schematic illustration of a streaming data processing system configured for side-channel timing attack mitigation; and, FIG. 3 is a flow chart illustrating a process for side-channel timing attack mitigation in streaming data decryption.

The process described in connection with FIG. 1 may be implemented within a streaming data processing system. In further illustration, FIG. 2 schematically depicts a streaming data processing system configured for side-channel timing attack mitigation. The system includes a host computing system 210 that includes memory 220 and at least one processor 230. The host computing system 210 is communicatively coupled to different computing devices 250, 250a-n over computer communications network 240 and is enabled to receive from each of the devices 250, an encrypted data stream 280. Finally, the system includes a constant time decryption module 300.

The constant time decryption module 300 includes computer program instructions enabled upon execution in the memory 220 of the host computing system 210 to perform constant time decryption of the encrypted data stream 280. In this regard, the program instructions during execution extract from the encrypted data stream 280 a key disposed in an encryption envelope of the encrypted data stream 280 and also a MAC included in the encrypted data stream 280. The program instructions during execution further generate based upon the extracted key a dummy key, and the program instructions during execution create a MAC based upon the content of the encryption envelope and the extracted key. The program instructions during execution yet further compare the created MAC with the extracted MAC. On the condition that the MACs are equivalent, the program instructions decrypt the cipher text of the encrypted data stream 280 utilizing the extracted key to produce cipher text 270. But otherwise, the program instructions decrypt the cipher text of the encrypted data stream 280 utilizing the dummy key to produce dummy text 260.

Figure 3:
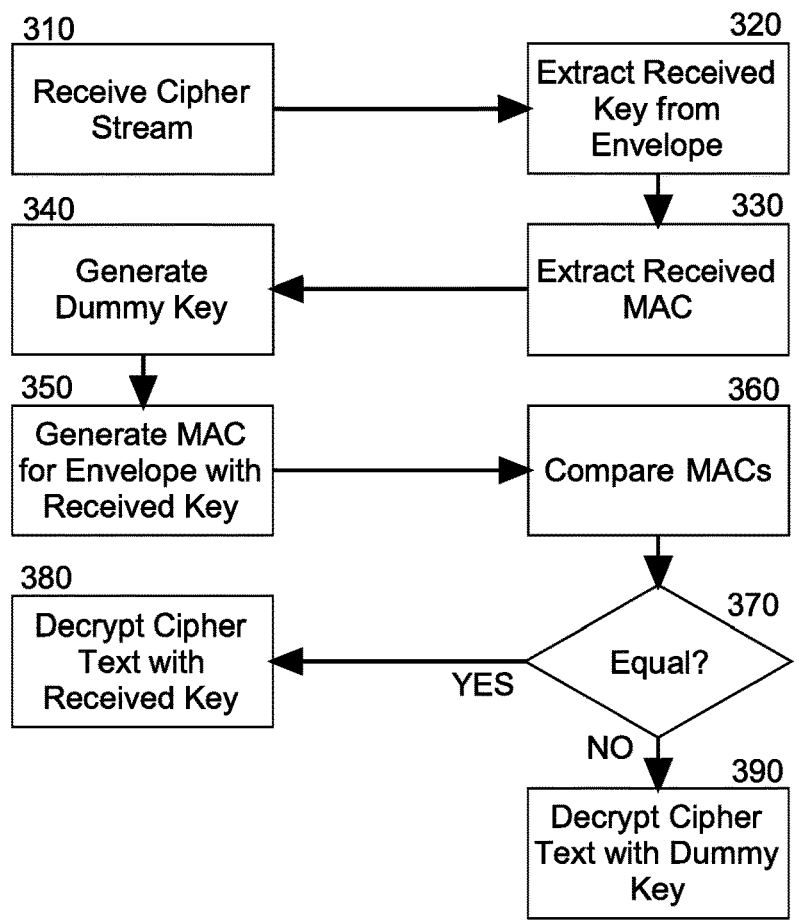

In even yet further illustration of the operation of the constant time decryption module 300, FIG. 3 is a flow chart illustrating a process for side-channel timing attack mitigation in streaming data decryption. Beginning in block 310, a cipher stream is received in memory of the computing system and in block 320, a key disposed within an encryption envelope of the cipher stream is extracted. In block 330, a MAC also is extracted from the received cipher stream and in block 340, a dummy key is generated. As well, in block 350, a MAC is generated using a hash function and the extracted key.

In block 360, the generated MAC and the extracted MAC are compared to one another. In decision block 370, if it is determined that the generated MAC and the extracted MAC are equivalent, then in block 380 the cipher text of the cipher stream is decrypted utilizing the extracted key. But otherwise, if it is determined in block 370 that the generated MAC and the extracted MAC are not equivalent, then in block 390 the cipher text of the cipher stream is decrypted using the generated dummy key.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims as follows:

What is claimed is:

1. A computer-implemented method for side-channel attack mitigation in streaming encryption, the method when executed by data processing hardware causes the data processing hardware to perform operations comprising:
   reading an input stream into a decryption process;
   extracting from the input stream:
      an encryption envelope having a wrapped key;
      a cipher text; and
      a first message authentication code (MAC);
   generating a second MAC using the wrapped key of the encryption envelope; and
   performing decryption of the cipher text in constant time by:
      determining whether the encryption envelope is authentic by comparing the first MAC extracted from the encryption envelope and the second MAC generated using the wrapped key;

when the encryption envelope is authentic, generating an authenticated decryption of the cipher text using the wrapped key of the encryption envelope; and wherein performing decryption of the cipher text in constant time indicates whether the wrapped key is an actual key that generated the cipher text of the encryption envelope.

2. The method of claim 1, wherein the operations further comprise returning the decrypted cipher text as output of the decryption process.

3. The method of claim 1, wherein the operations further comprise:
performing a MAC verification on the cipher text after decryption;
determining whether the MAC verification on the cipher text after decryption fails; and
when the MAC verification on the cipher text after decryption fails, returning a failure code and the decrypted cipher text as an output of the decryption process.

4. The method of claim 1, wherein the encryption envelope is authentic when the comparison between the first MAC and the second MAC indicates the first MAC is equivalent to the second MAC.

5. The method of claim 1, wherein generating the second MAC comprises using both the wrapped key of the encryption envelope and data contained in the encryption envelope.

6. The method of claim 1, wherein generating the second MAC comprises using both the wrapped key of the encryption envelope and a hash MAC generation function.

7. The method of claim 1, wherein performing decryption of the cipher text in constant time indicates whether the first MAC was generated using the actual key that generated the cipher text of the encryption envelope.

8. The method of claim 1, wherein comparing the first MAC and the second MAC is performed by a comparator.

9. The method of claim 1, wherein the wrapped key of the encryption envelope is generated using a wrap key and the actual key.

10. The method of claim 1, wherein the first MAC is generated using the actual key prior to a streaming process.

11. A streaming decryption data processing system comprising:
a host computer comprising memory and at least one processor;
a decryption process executing in the memory of the host computer and performing decryption of input streams; and,
a side-channel attack mitigation module comprising computer program code executing in the memory of the host computer, the program code during execution causing the processor to perform operations comprising:
reading an input stream into the decryption process;
extracting from the input stream:
an encryption envelope having a wrapped key;
a cipher text; and
a first message authentication code (MAC);
generating a second MAC using the wrapped key of the encryption envelope; and,
performing decryption of the cipher text in constant time by:
determining whether the encryption envelope is authentic by comparing the first MAC extracted from the encryption envelope and the second MAC generated using the wrapped key;
when the encryption envelope is authentic, generating an authenticated decryption of the cipher text using the wrapped key of the encryption envelope; and
wherein performing decryption of the cipher text in constant time indicates whether the wrapped key is an actual key that generated the cipher text of the encryption envelope.

12. The system of claim 11, wherein the operations further comprise returning the decrypted cipher text as output of the decryption process.

13. The system of claim 11, wherein the operations further comprise:
perform a MAC verification on the cipher text after decryption;
determine whether the MAC verification on the cipher text after decryption fails; and
when the MAC verification on the cipher text after decryption fails, return a failure code upon failure and the decrypted cipher text as an output of the decryption process.

14. The system of claim 11, wherein the encryption envelope is authentic when the comparison between the first MAC and the second MAC indicates the first MAC is equivalent to the second MAC.

15. The system of claim 11, wherein generating the second MAC comprises using both the wrapped key of the encryption envelope and data contained in the encryption envelope.

16. The system of claim 11, wherein generating the second MAC comprises using both the wrapped key of the encryption envelope and a hash MAC generation function.

17. The system of claim 11, wherein performing decryption of the cipher text in constant time indicates whether the first MAC was generated using the actual key that generated the cipher text of the encryption envelope.

18. The system of claim 11, wherein comparing the first MAC and the second MAC is performed by a comparator.

19. The system of claim 11, wherein the wrapped key of the encryption envelope is generated using a wrap key and the actual key.

20. The system of claim 11, wherein the first MAC is generated using the actual key prior to a streaming process.

* * * * *